US006880439B2

(12) United States Patent
Kersch et al.

(10) Patent No.: US 6,880,439 B2
(45) Date of Patent: Apr. 19, 2005

(54) METHOD OF CROSSCUTTING A MOVING WEB

(75) Inventors: Robert Kersch, Augsburg (DE); Wolfgang Zeller, Gersthofen (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 10 days.

(21) Appl. No.: 10/397,951

(22) Filed: Mar. 26, 2003

(65) Prior Publication Data

US 2003/0183056 A1 Oct. 2, 2003

(30) Foreign Application Priority Data

Mar. 28, 2002 (DE) ........................................ 102 13 978

(51) Int. Cl.[7] ............................ B23D 25/02; B26D 1/62

(52) U.S. Cl. ............................... 83/38; 83/324; 83/349

(58) Field of Search .......................... 83/324, 334, 349, 83/38

(56) References Cited

U.S. PATENT DOCUMENTS 5,000,812 A * 3/1991 Murphy ...................... 156/268
6,360,640 B1 * 3/2002 Cote ........................... 83/287

FOREIGN PATENT DOCUMENTS

| | | | |
|---|---|---|---|
| DE | 28 12 849 C2 | 1/1985 | B26D/5/32 |
| DE | 36 08 111 C1 | 10/1987 | B26D/5/08 |
| DE | 44 17 493 A1 | 11/1995 | B26D/1/40 |
| DE | 100 30 055 A1 | 1/2001 | B26D/7/27 |
| GB | 1602408 | 11/1981 | B26D/5/32 |

* cited by examiner

*Primary Examiner*—Charles Goodman
(74) *Attorney, Agent, or Firm*—Cohen, Pontani, Lieberman & Pavane

(57) ABSTRACT

A method of cross-cutting a moving web uses a cutting knife operably mounted on a knife cylinder having a circumferential distance $L_Z$ where $L_Z$ is smaller than a cut length, $L_A$. The knife cylinder for revolving in a first and a second opposite direction is powered by a drive motor in either direction. The method includes revolving the knife cylinder in a first direction, cutting the web with the cutting knife, and completing a first cut. The knife cylinder is then reversed to retard progress in the first direction and then accelerated to the speed of the moving web until starting the second cut.

7 Claims, 2 Drawing Sheets

METHOD OF CROSSCUTTING A MOVING WEB

BACKGROUND OF THE INVENTION

1. Field of the Invention

The invention relates to a device for and a method of cross-cutting a moving web using a knife cylinder having at least one cutting knife which rotates about an axis parallel to the cutting line.

2. Description of the Related Art

U.S. Pat. No. 6,360,640 discloses a method of cross-cutting a web using a knife cylinder. In order to vary the length of the cut products, i.e. vary the cut length, the knife cylinder is driven at a circumferential speed that differs from the web speed, except during cutting. In the case of small cut lengths or when the knife cylinder has a plurality of cutting knives distributed uniformly over the circumference, the speed change has to be completed during a small amount of circumferential travel. This requires high accelerations and powerful up-shifting, i.e. acceleration torque, of the drive motor. Consequently, this presents practical limitations when implemented.

SUMMARY OF THE INVENTION

It is an object of the invention to provide a cross-cutting method in which the required acceleration torque of the knife cylinder is low.

According to the invention, this and other objects are achieved by a method for cross-cutting a moving web with a cutting knife operably mounted on a knife cylinder having a circumferential distance $L_Z$ where $L_Z$ is smaller than a cut length $L_A$. The knife cylinder for revolving in a first and second opposite direction is powered by a drive motor in either direction. The method includes revolving the knife cylinder in a first direction, cutting the web with the cutting knife, and completing a first cut. The knife cylinder is then reversed to retard progress in the first direction and then accelerated to the speed of the moving web until starting the second cut with the cutting knife.

In order to achieve a low acceleration torque of the knife cylinder with high speed changes, a low moment of inertia is striven for. This is advantageously achieved by using a knife cylinder with a small diameter, so that the circumference of the knife cylinder is small in comparison with the cut length. Thus, the circumference over which the knife cylinder can be accelerated for the subsequent cut is correspondingly reduced. However, by reversing the travel direction of the knife cylinder following the first cut, the circumferential areas over which a speed change may occur are lengthened, being configured so as to overlap. Overlapping the areas over which a speed change in the cylinder may occur when cut lengths are greater than the circumference of the knife cylinder has the advantage that the maximum driven moment of the motor needed to change the speed decreases. This occurs because the braking and acceleration travel based on the circumference of the knife cylinder may be increased up to twice the circumferential value, because of the overlap.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
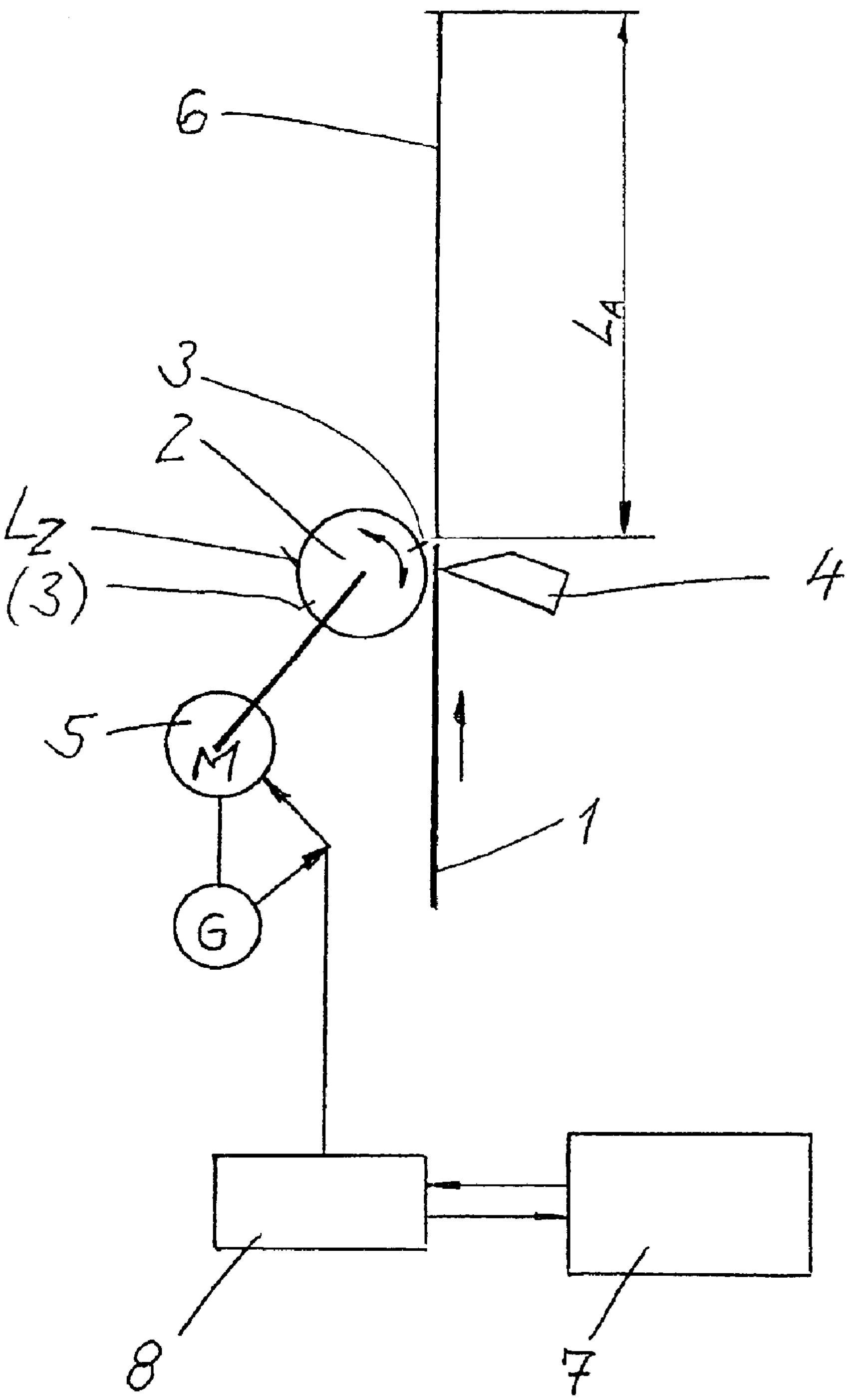
FIG. 1 shows a view of an apparatus for cross-cutting a web.

The apparatus for cross-cutting a web 1, shown in FIG. 1, includes a knife cylinder 2 fitted with at least one cutting knife 3 which during the rotation of the knife cylinder 2 rotates about its axis of rotation, wherein the axis of rotation is parallel to the cutting line.

The cutting knife 3 cooperates with an opposing knife 4 which is arranged in a fixed position. While the opposing knife 4 may rotate about an axis, it may also be designed as a cutting bar. Such a cutting bar may, for example, be housed in a folding cylinder, for example as a folding-blade cylinder of a folder. The cutting knife 3 and the opposing knife 4 can be arranged with an angular offset in relation to the cutting line to be made, in order to make a shearing cut.

It is also possible for a plurality of cutting knives to be arranged distributed uniformly on the circumference of the knife cylinder 2. For example, a second cutting knife (3) has been indicated on cylinder 2 in FIG. 1 by thinner lines. The knife cylinder 2 is driven by a motor 5 in the form of an electric motor.

During a complete revolution, the knife cylinder 2 cuts a sheet 6 from the web 1 as the cutting knife 3 passes the opposing blade 4. This sheet may also be a signature or a product.

During the cut, the circumferential speed of the cutting knife 3 is approximately equal to the speed of the web 1 where web 1 advances substantially in the direction of the single headed arrow.

In accordance with one embodiment of the invention, when a single cutting knife 3 is disposed on a knife cylinder 2 with a circumference $L_Z$, the sheet has the cut length $L_A$. In accordance with one embodiment of the invention, when two or more cutting knives 3 are disposed on the knife cylinder 2, $L_Z$ expresses the circumferential spacing between two cutting knives 3 cutting one after another, wherein the circumference $L_Z$ has a smaller dimension than the cut length $L_A$.

Figure 2:
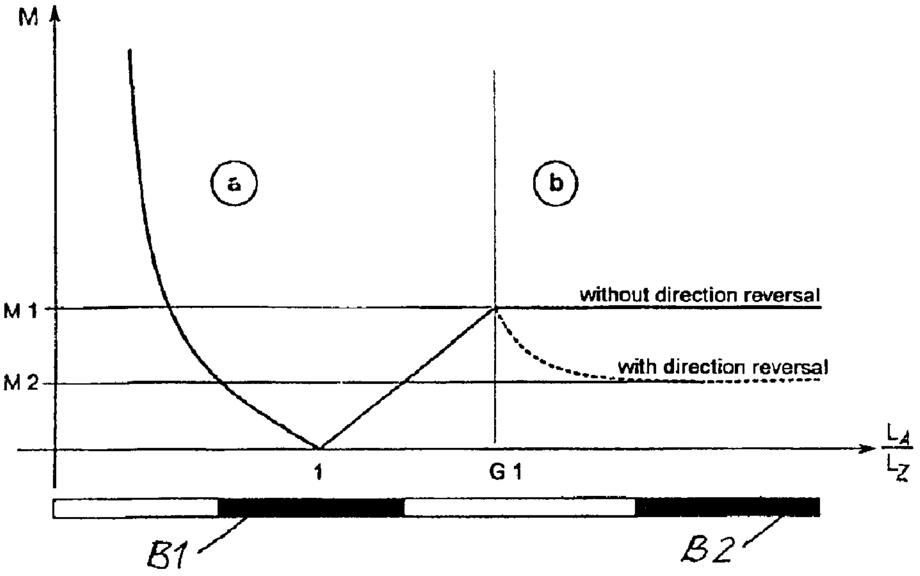
FIG. 2 shows a view of the course of the necessary drive torque for a knife cylinder fitted with one cutting knife.

In one embodiment, the ratio between $L_A$ and $L_Z$ is advantageously chosen to be in the region B2 of the bar element in FIG. 2. In this region B2, the knife cylinder 2 is advantageously operated with direction reversal. Therein, after the cut, the knife cylinder 2 is retarded with direction reversal and is then accelerated to the web speed until the next step. As a result, the maximum drive torque M of the motor 5 needed to change the circumferential speed decreases, since die braking and acceleration travel based on the circumference $L_Z$ of the knife cylinder 2 may be increased as far as approximately twice the circumferential value, because of the overlap. The drive torque M then assumes the course illustrated by dashed line in FIG. 2 wherein knife cylinder 2 is fitted with one cutting knife 3.

Since the limiting value of the maximum drive torque M2 is known, i.e. is predefined, the region B2 can be used to dimension the drive motor. Without direction reversal, the result would be the limiting value M1 for the maximum drive torque.

The advantage of the torque reduction as a result of speed reversal is useful if the ratio to be cut between cut length $L_A$ and circumference $L_Z$ of the knife cylinder 2 lies in the area b of FIG. 2. If in addition the operating point G1, at which the knife cylinder 2 comes to its brief stop during the speed change, is saved for operation, the drive torque can be restricted to the limiting value M2. A further region B1 for the operation of the device with a maximum drive torque M2 is indicated in FIG. 2.

When direction reversal is used, the direction of rotation of the knife cylinder 3 is reversed in a restricted region of one revolution or in a region between two cutting knives 3 cutting one after another in the case of the multiple arrangement of cutting knives 3 on the knife cylinder 2. The method uses the current position and speed of the web 1 and assigns to this the rotational angle $\phi$ and the angular speed of the knife cylinder 2. In the area of the overlap between the braking and acceleration travels, one point on the circumference of the knife cylinder 2 has, for a restricted time period, an opposite sign to the direction of movement of the web 1.

For the purpose of technical implementation of the (angular) positions or (angular) speeds of web 1 and knife cylinder 2, the following criteria are met by the method illustrated in order to produce the algorithm:

continuity of the angular position and of the first derivative of the angular position of the knife cylinder 2;

preventing travel past the cut position during the phase of the speed change;

region of coincident speed between a point on the circumference of the knife cylinder and the web 1 during the cut and in a definable region before and after the time of the cut, where this region before and after the cut does not necessarily have to be of equal size; and establishing that the above criteria have been met (stability of the algorithm) with the aid of characteristic numbers.

Figure 3:
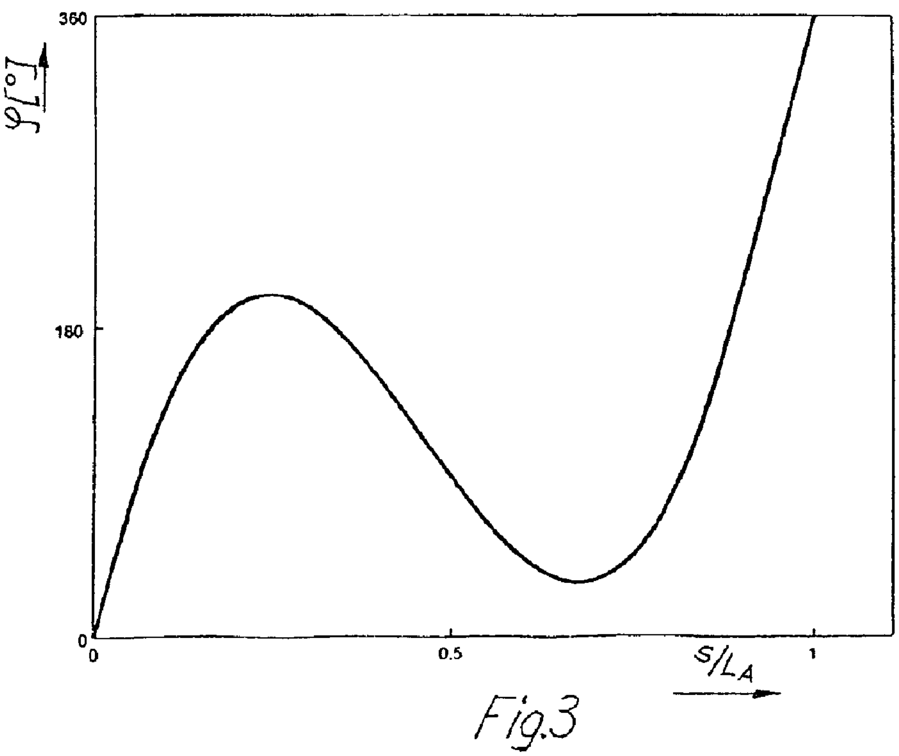
FIG. 3 shows a view of the rotary angle of the knife cylinder with respect to the web position based on a cut length.

For the calculation of the compensation movement, a polynomial of third order (cubic splines), for example, has been determined to be suitable. In accordance with such a polynomial, the rotational angle $\phi$ of the knife cylinder 2 is presented against the web position s, based on the cut length $L_A$, in FIG. 3. A computing and storage unit 7 is connected to a motor controller 8 of the motor 5 of the knife cylinder 2 and forwards the control commands that implement this function, coordinated with the position of the printed image of the web 1, to the motor controller 8 (FIG. 1).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of cross-cutting a web along a series of cutting lines in a web-fed rotary printing press to produce a series of sheets, each sheet having a cut length, said method comprising:

providing a knife cylinder in a web fed rotary printing press, the knife cylinder having an axis of rotation, a cutting knife, and a circumference which is less than the cut length of a sheet;

moving the web through the press at an approximately constant web speed;

rotating the knife cylinder in a first direction with a circumferential speed that corresponds to the web speed while the web is being cross-cut by the cutting knife;

reversing the direction of rotation of the knife cylinder after completing a cross-cut;

bringing the knife cylinder to a stop following the reversing; and accelerating the knife cylinder in the first direction until the knife cylinder is again rotating with a circumferential speed which corresponds to the web speed, prior to making another cross-cut.

2. A method as in claim 1 wherein the axis of rotation is parallel to the cutting lines.

3. A method as in claim 1 wherein the knife cylinder has only one cutting knife.

4. A method as in claim 1 wherein the knife cylinder has two cutting knives.

5. A method as in claim 1 wherein, during the cross-cutting by the cutting knife, the knife cylinder has an angular position which is synchronized with the position of the web in accordance with an algorithm.

6. A method as in claim 5 wherein the algorithm is a third order polynomial.

7. A method as in claim 1 wherein the knife cylinder is rotated by a drive motor, said method further comprising:

predetermining a maximum torque of the drive motor; and accelerating the knife cylinder in accordance with the maximum drive torque and the cut length of a sheet.

* * * * *